US012209022B1

(12) United States Patent
Stallard et al.

(10) Patent No.: US 12,209,022 B1
(45) Date of Patent: Jan. 28, 2025

(54) METHOD FOR TRANSFORMING GREENHOUSE GAS EMISSIONS INTO GREENHOUSE GAS CONVERSION BOULES

(71) Applicants: Jean M Stallard, Virginia Beach, VA (US); Patrick L Huddie, Crownsville, MD (US)

(72) Inventors: Jean M Stallard, Virginia Beach, VA (US); Patrick L Huddie, Crownsville, MD (US)

( * ) Notice: Subject to any disclaimer, the term of this patent is extended or adjusted under 35 U.S.C. 154(b) by 0 days.

(21) Appl. No.: 18/886,371

(22) Filed: Sep. 16, 2024

Related U.S. Application Data

(63) Continuation-in-part of application No. 18/388,972, filed on Nov. 13, 2023.

(51) Int. Cl.
  *C01B 32/50* (2017.01)
  *G06Q 30/018* (2023.01)
  *G06Q 40/04* (2012.01)

(52) U.S. Cl.
  CPC ...... *C01B 32/50* (2017.08); *C01B 2203/1666* (2013.01); *G06Q 30/018* (2013.01); *G06Q 40/04* (2013.01)

(58) Field of Classification Search
  USPC ...................................................... 423/437.1
  See application file for complete search history.

(56) References Cited

U.S. PATENT DOCUMENTS

| 7,983,929 | B2* | 7/2011 | Zimmerman | 705/1.1 |
| 8,930,255 | B2* | 1/2015 | Margolis et al. | 705/36 |
| 2004/0158478 | A1* | 8/2004 | Zimmerman | 705/1 |
| 2004/0200393 | A1* | 10/2004 | Zauderer | 110/345 |
| 2009/0210295 | A1* | 8/2009 | Edholm et al. | 705/11 |
| 2011/0055092 | A1* | 3/2011 | Fargano et al. | 705/317 |
| 2011/0191256 | A1* | 8/2011 | Sayre et al. | 705/317 |
| 2011/0208621 | A1* | 8/2011 | Feierstein et al. | 705/30 |

(Continued)

OTHER PUBLICATIONS

Christopher Blaufelder et al., A blueprint for scaling voluntary carbon markets to meet the climate challenge, Jan. 29, 2021, Mc Kinsey & Company. (Year: 2021).*

(Continued)

*Primary Examiner* — Scott C Anderson
*Assistant Examiner* — George N. Proios
(74) *Attorney, Agent, or Firm* — Gulfcoast Intellectual Property Group

(57) ABSTRACT

A method of transforming greenhouse gas emissions into carbon dioxide wherein the carbon dioxide is subsequently employed to manufacture new products or for a new use, and the transformed carbon dioxide is ensuingly employed to create carbon credits. The invention includes identification of a greenhouse gas emission and sampling thereof. In a beta test, the sample is transformed into carbon dioxide utilizing suitable equipment based on an intended application for the carbon dioxide. The carbon dioxide utilized is measured in metric tons. The carbon dioxide created from the transformation of greenhouse gas emissions is utilized to manufacture concrete, fertilizer, fuels or for enhanced oil recovery. The invention includes the creation of a greenhouse gas conversion boule that consists of the beta sample product, the amount of carbon dioxide utilized in the beta sample product, and the remaining metric tons of carbon dioxide required to complete the proposed transformation project.

7 Claims, 1 Drawing Sheet

(56) References Cited

U.S. PATENT DOCUMENTS

2012/0084193 A1\*  4/2012  Marino .......................... 705/37
2013/0280152 A1\* 10/2013  Singh ............................ 423/232
2019/0005578 A1\*  1/2019  Gagne ................... G06Q 40/04
2023/0245135 A1\*  8/2023  Redden ............... G06Q 30/018

OTHER PUBLICATIONS

Jennier L, The Top 4 Carbon Exchanges for 2024, May 19, 2022, CarbonCredits.com. (Year: 2022).\*
Everything You Need to Know About Carbon Credits, Jun. 21, 2023, ClimateTrade.com. (Year: 2023).\*
What are carbon markets and why are they important, May 18, 2022, UNDP Global Climate Promise. (Year: 2022).\*

\* cited by examiner

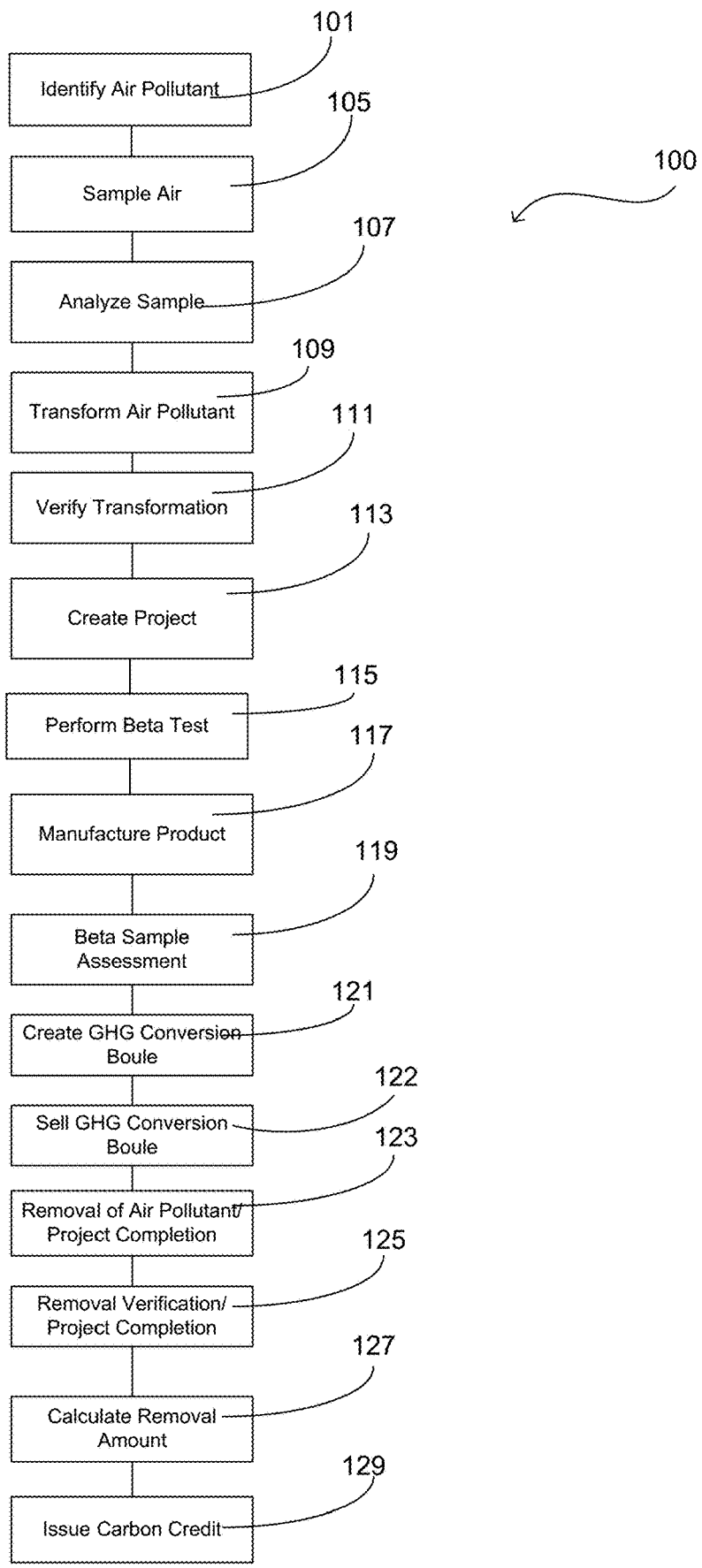

METHOD FOR TRANSFORMING GREENHOUSE GAS EMISSIONS INTO GREENHOUSE GAS CONVERSION BOULES

CROSS REFERENCE TO RELATED APPLICATIONS

This application is a continuation-in-part of U.S. application Ser. No. 18/388,972, filed Nov. 13, 2023 and entitled, Method of Creating an Emissions Credit Financial Instrument, in the name of Jean M. Stallard, which is hereby incorporated for reference.

FIELD OF THE INVENTION

The present invention relates generally to reduction of greenhouse gas emissions, more specifically but not by way of limitation, a method of transforming greenhouse gas emissions and air pollution into carbon dioxide and subsequently new products such as but not limited to specialized concrete products wherein the carbon dioxide amount captured and utilized is employed in the creation of greenhouse gas conversion boules that are ensuingly transformed into a carbon credits.

BACKGROUND

Two of the greatest threats to our planet are greenhouse gases and air pollution. Greenhouse gases trap heat and makes the planet warmer. Scientists believe that greenhouse gas emissions from human activities are responsible for most of the increases in greenhouse gases over the last 150 years. One of the largest sources of man-made greenhouse gas emissions is the use of fossil fuels for power, heat and transportation. The energy sector, including oil & gas, coal and bioenergy industries, is responsible for substantial greenhouse gas emissions from the exploration, production, mining and refining of its products and by-products. Air pollution profoundly damages our air quality. It contributes to the formation of ozone, pollution particles and the deposit of acids, and results in numerous deleterious effects for humans and the environment. In 2022, approximately 66 million tons of pollution were emitted into the atmosphere in the United States alone. Both greenhouse gas emissions and air pollution consist of, include or contain carbon and carbon dioxide. This carbon dioxide can be reduced, captured and/or removed.

A market exists for carbon dioxide reduction, capture and/or removal, where the units are measured in metric tons, a literal measurement of weight. These units are called carbon credits and are intended to incentivize the reduction and removal of carbon dioxide. Current carbon credits are, however, primarily focused on emissions reductions established by unreliable, highly subjective projections, such as carbon dioxide consumption by trees planted in remote rainforests, rather than empirical, verifiable measurements of carbon dioxide. This focus results in a dearth of high quality carbon credits and undermines the goal of reducing global greenhouse gas emissions. In addition, nowhere is the carbon dioxide derived from air pollution addressed by carbon credits. A great number of technological innovations exist and are being created to capture carbon dioxide and transform it into new articles and uses such as cement, fertilizer and enhanced oil recovery.

Each of these technologies process objectively verifiable and measurable quantities of carbon dioxide. However, there is a critical link missing between the carbon dioxide transformed via these technologies and the carbon credit. That link is the present invention wherein the method of the present invention has been created to scientifically establish amounts of existing greenhouse gas emissions and to transform those emissions into new products and uses, and thereby create greenhouse gas conversion boules for proven, tangible and objectively verifiable reductions in carbon dioxide so that the amount of carbon dioxide contained therein is ensuingly used to create carbon credits and carbon offsets. Carbon credits and carbon offsets are used interchangeably herein.

Accordingly, there is a need for this invention to advance technologies that verifiably reduce and eliminate greenhouse gas emissions and air pollution.

SUMMARY OF THE INVENTION

It is the object of the present invention to provide a method for transforming greenhouse gas emissions into a greenhouse conversion boule employed for creating carbon credits wherein the present invention includes identification of a source of air pollution and/or greenhouse gas emissions.

Another object of the present invention is to provide a method for transforming an air pollutant into carbon dioxide for use in production of a specialized product wherein the present invention includes utilization of an air sampler to identify and measure the air pollutants at the identified source.

A further object of the present invention is to provide a method for transforming greenhouse gas emissions into a greenhouse conversion boule employed for creating carbon credits wherein the present invention includes sampling the air from the identified source and transforming the air sample into carbon dioxide.

Yet a further object of the present invention is to provide a method for transforming greenhouse gas emissions into carbon dioxide for use in production of a specialized product and/or use wherein the carbon dioxide created from the sample is transformed into products such as but not limited to specialized concrete products.

Still another object of the present invention is to provide a method for transforming greenhouse gas emissions into a greenhouse conversion boule employed to create carbon credits wherein the present invention includes measuring the metric tons of carbon dioxide utilized in manufacture of the products.

An additional object of the present invention is to provide a method for transforming greenhouse gas emissions into carbon dioxide for use in production of a specialized product that is further employed for creation of a greenhouse gas conversion boule.

Yet a further object of the present invention is to provide a method for transforming greenhouse gas emissions into a greenhouse conversion boule employed to create carbon credits wherein the method of the present invention further utilizes equipment such as but not limited to gas analyzers and oil well analyzers for verification and validation of carbon dioxide transformation into a new product or new use.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Descrip- FIG. 1 is a flowchart of the process of the present invention.

DETAILED DESCRIPTION

Referring now to the drawings submitted herewith, wherein various elements depicted therein are not necessarily drawn to scale and wherein through the views and figures like elements are referenced with identical reference numerals, there is illustrated a method for transforming greenhouse gas emissions into greenhouse gas conversion boules 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the FIGURE submitted herewith, the method for transforming greenhouse gas emissions into greenhouse gas conversion boules 100. It should be understood within the scope of the present invention that the process discussed and diagrammed herein is exemplary and alterations of the process order, elimination of steps and utilization of conventional computing equipment to facilitate operation of the method of the present invention is intrinsic within the scope of the method for transforming greenhouse gas emissions into greenhouse gas conversion boules 100 discussed herein.

Step 101, the operator of the method for transforming greenhouse gas emissions into greenhouse gas conversion boules 100 identifies at least one source of air pollutant. It should be understood that the source of emitted air pollutant could be man-made or natural. It should be further understood within the scope of the present invention as described herein that the terms greenhouse gas and air pollution/pollutants are synonymous. In step 101, the type of air pollutants is identified utilizing an air analyzer. Those skilled in the art should understand that various types of air analyzers could be utilized, such as but not by way of limitation, infrared air analyzers. Step 105, at the identified source of air pollution, the air is sampled. The sampling of the air at the identified location of air pollution is performed employing suitable air sampling technology. By way of example but not limitation, the sampling of the air at the identified location of air pollution utilizes air sampling pumps with sorbent tubes. In step 107, the air pollution sample is analyzed, in particular qualitative and/or quantitative analysis devices employing instruments such as but not limited to nondispersive infrared sensors that are either active or passive in operation. Furthermore, the total amount of air pollution produced at the identified source is calculated, wherein the amount is in metric ton units or converted thereto.

Step 109, the air pollution sample is transformed into carbon dioxide. It should be understood within the scope of the present invention that various technologies could be utilized to transform the air pollution sample into carbon dioxide. By way of example but not limitation, the present invention could utilize a combination of a pre-scrubber and a stripper used in the carbon capture process. As is known in the art, prior to being able to capture carbon dioxide emissions from an industrial facility, other contaminants such as but not limited to sulfur dioxide must be removed. This is accomplished utilizing a scrubbing process utilizing an absorber tower wherein the carbon dioxide is absorbed by an amine solvent. The result is a solvent high in concentration of carbon dioxide which is processed with a stripper and heated to release the carbon dioxide. This pure carbon dioxide can be stored or utilized for alternate uses such as enhanced oil recovery or in manufacturing of specialized cement. Alternatively, a special incinerator such as an afterburner to transform the air pollution sample into carbon dioxide. In step 111, suitable instrumentation is employed to provide verification that the air pollution sample was converted into carbon dioxide. The verification that the air pollution sample was successfully converted into carbon dioxide can be performed utilizing gas analyzers, such as but not limited to emission gas analyzers. A conversion ratio is determined wherein the conversion ratio identifies how many metric tons of carbon dioxide can be produced from the amount of air pollution captured. While the conversion ratio can be a one-to-one ratio, the ratio can be less depending upon capture and/or conversion techniques employed for the specific application.

Step 113, the operator of the method for transforming greenhouse gas emissions into greenhouse gas conversion boules 100 identifies a project that transforms carbon dioxide into a new article or a new use thereof. The proposed transformation project may or may not be located at the source of the sampled air pollution. Ensuing identification of the project, the operator of the method for transforming greenhouse gas emissions into greenhouse gas conversion boules 100 initiates a project having the aforementioned objective. In step 115, the operator of the method for transforming greenhouse gas emissions into greenhouse gas conversion boules 100 will initiate a beta-test project for the identified project. It should be understood within the scope of the present invention that the beta-test project is an execution of the method of the present invention that would represent a percentage of the greenhouse gas emissions from the identified source that is less than twenty five percent of the total calculated greenhouse gas emissions from the source. Step 117 includes the utilization of project specific machinery that will transform the carbon dioxide (either being released or converted from alternate gas emission) into a specialized product or use, defined herein as a beta sample product. By way of example but not limitation a beta sample product can be as follows. In one embodiment of the present invention, the captured greenhouse gas from the project converted into carbon dioxide as previously described herein, is utilized to manufacture concrete produced by carbon dioxide mineralization employing known in the art techniques and equipment. Step 117 further includes measuring the amount of carbon dioxide produced from the transformation of greenhouse gas for creation of the beta sample, captured and subsequently utilized for manufacture of concrete. Measurement of the carbon dioxide is performed in metric tons. It should be further understood that alternate products and/or uses of the carbon dioxide from the project are contemplated in addition to the aforementioned. By way of example but not limitation, direct air capture for enhanced oil recovery from oil wells.

In step 119, the beta sample is assessed to provide verification of the of the transformation of the carbon dioxide into the beta sample product. Equipment employed to perform the assessment of the beta sample product is project specific and can include equipment such as oil well analyzers, gas analyzers or facilities such as cement testing laboratories. Step 121, the operator of the method for transforming greenhouse gas emissions into greenhouse gas conversion boules 100 initiates creation of a greenhouse gas conversion boule. The greenhouse gas conversion boule is defined as follows: the agglomerate of the beta sample product plus the amount of carbon dioxide measured in metric tons from step 115 herein utilized in creation of the beta sample product plus the remaining metric tons of carbon dioxide calculated to complete the project. The greenhouse gas conversion boule is a metric ton amount of carbon dioxide of the two aforementioned parameters plus the beta sample product. It should be understood within the scope of the present invention that the remaining tons of carbon dioxide are calculated by subtracting the amount of carbon dioxide in metric tons utilized in production of the beta sample from the total metric tons of carbon dioxide calculated to complete the project. In step 122, the operator of the method for transforming greenhouse gas emissions into greenhouse gas conversion boules 100 will sell the greenhouse gas conversion boule. It should be understood within the scope of the present invention that the greenhouse gas conversion boule is sold privately, or via suitable public markets, platforms and/or institutions.

Step 123, the removal of the greenhouse gases and subsequent conversion into carbon dioxide and transforming the carbon dioxide into a new product such as but not limited to cement or into a new use such as but not limited to oil well recovery employing direct air capture methods is performed and completed. In step 125, validation of completion of the project is performed utilizing project specific equipment such as but not limited gas analyzers or oil well analyzers. Step 127, the amount of greenhouses gases removed and the subsequent conversion of metric tons of carbon dioxide is calculated at the completion of the project. In step 129, a carbon credit/carbon offset can be created based on carbon dioxide eliminated at the source of the greenhouse gases.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of transforming greenhouse gas emissions and air pollution into carbon dioxide to be utilized in manufacture of products or in new uses wherein the method comprises:

identifying a greenhouse gas emission source, wherein the greenhouse gas emission source is identified with an air analyzer;

sampling the greenhouse gas emission source, wherein a volume of the greenhouse gas emission is captured, wherein the volume of greenhouse gas sampled is less than a total amount of greenhouse gas being emitted;

analyzing the greenhouse gas sample to determine type and constituents;

calculating an amount of carbon dioxide, wherein the amount of carbon dioxide is measured in metric tons and wherein the amount of carbon dioxide results from the transformation of the sample;

calculating a total amount of carbon dioxide, wherein the total amount of carbon dioxide is measured in metric tons and wherein the total amount of carbon dioxide is calculated for completion of a proposed carbon dioxide transformation project in which total amount of carbon dioxide is transformed into new products or utilized in new uses;

transforming a sample volume of greenhouse gas into carbon dioxide, wherein the sample volume of greenhouse gas is transformed into carbon dioxide utilizing a first device or a second device;

verifying transformation of the volume of greenhouse gas into carbon dioxide, wherein the air analyzer is utilized to verify the transformation of the sample volume greenhouse gas into carbon dioxide;

measuring the amount of carbon dioxide, wherein the amount of carbon dioxide formed from the transformation of the sample volume of greenhouse gas is measured in metric tons;

employing the carbon dioxide for manufacture of a new product or for a new use in a beta test;

assessing employment of carbon dioxide, wherein testing is performed on results for the beta test;

creating a greenhouse gas conversion boule, wherein the greenhouse gas conversion boule consists of the beta test product, the amount of carbon dioxide captured and utilized to make the beta test product as measured in metric tons, plus the remaining portion of carbon dioxide needed to complete the proposed project as measured in metric tons;

selling the greenhouse gas conversion boule, wherein the greenhouse gas conversion boule is sold privately, or via suitable public markets, platforms and/or institutions;

capturing a remaining portion of greenhouse gas emissions needed to complete the proposed transformation project;

verifying capture of the remaining portion of greenhouse gas emissions;

transforming the remaining portion of greenhouse gas emissions into carbon dioxide;

verifying the transformation of the remaining portion of greenhouse gas emissions into carbon dioxide;

calculating the amount of carbon dioxide resulting from the transforming of the remaining portion of greenhouse gas emissions, wherein the amount of carbon dioxide is measured in metric tons;

completing the proposed transformation project;

using the total captured amount of carbon dioxide, measured in tons, to create a carbon credit, wherein the carbon credit is created from the amount of carbon dioxide resulting from the transforming of the remaining portion of greenhouse gas, wherein the carbon credit is a metric ton amount.

2. The method of transforming greenhouse gas emissions and air pollution into carbon dioxide to be utilized in manufacture of products or new uses as recited in claim 1, wherein the first device is an incinerator.

3. The method of transforming greenhouse gas emissions and air pollution into carbon dioxide to be utilized in manufacture of products or new uses as recited in claim 1, wherein the sampling the greenhouse gas emission source is performed with air sampling pumps and sorbent tubes.

4. The method of transforming greenhouse gas emissions and air pollution into carbon dioxide to be utilized in manufacture of products or new uses as recited in claim 1, wherein the alternate use of the carbon dioxide is enhanced oil recovery from an oil well.

5. The method of transforming greenhouse gas emissions and air pollution into carbon dioxide to be utilized in manufacture of products or new uses as recited in claim 1, wherein the product is cement.

6. The method of transforming greenhouse gas emissions and air pollution into carbon dioxide to be utilized in manufacture of products or new uses as recited in claim 1, and further including a step of manufacturing a product utilizing the carbon dioxide created from transformation of the amount remaining portion into carbon dioxide.

7. The method of transforming greenhouse gas emissions and air pollution into carbon dioxide to be utilized in manufacture of new products or new uses as recited in claim 1, wherein the value of a greenhouse gas conversion boule is calculated in metric tons.

* * * * *